US012720126B1

(12) United States Patent
Hall

(10) Patent No.: US 12,720,126 B1
(45) **Date of Patent: *Aug. 25, 2026**

(54) BROADCAST SYNCHRONIZATION WITH FAN ENGAGEMENT PLATFORM

(71) Applicant: SportsMEDIA Technology Corporation, Durham, NC (US)

(72) Inventor: Gerard J. Hall, Durham, NC (US)

(73) Assignee: SportsMEDIA Technology Corporation, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/169,615

(22) Filed: Apr. 3, 2025

Related U.S. Application Data

(63) Continuation of application No. 18/978,826, filed on Dec. 12, 2024, now Pat. No. 12,289,480, which is a continuation of application No. 18/086,168, filed on Dec. 21, 2022, now Pat. No. 12,192,539, which is a continuation-in-part of application No. 17/978,598, filed on Nov. 1, 2022, now Pat. No. 12,010,357.

(60) Provisional application No. 63/274,301, filed on Nov. 1, 2021.

(51) Int. Cl.

| | |
|---|---|
| ***H04N 21/2187*** | (2011.01) |
| ***G06T 7/20*** | (2017.01) |
| ***G06T 7/70*** | (2017.01) |
| ***H04N 21/262*** | (2011.01) |
| ***H04N 21/43*** | (2011.01) |

(52) U.S. Cl.
CPC .......... *H04N 21/2187* (2013.01); *G06T 7/20* (2013.01); *G06T 7/70* (2017.01); *H04N 21/2625* (2013.01); *H04N 21/43076* (2020.08)

(58) Field of Classification Search
CPC .......... H04N 21/2187; H04N 21/2625; H04N 21/43076; G06T 7/20; G06T 7/70
See application file for complete search history.

(56) References Cited

U.S. PATENT DOCUMENTS

| | | | |
|---|---|---|---|
| 8,230,343 | B2 | 7/2012 | Logan et al. |
| 8,855,469 | B2 | 10/2014 | Maharajh et al. |
| 8,858,313 | B1 | 10/2014 | Selfors |
| 9,064,011 | B2 | 6/2015 | Maharajh et al. |
| 9,832,441 | B2 | 11/2017 | Osman |
| 10,205,776 | B2 | 2/2019 | Liang et al. |
| 10,275,578 | B2 | 4/2019 | Bilobrov et al. |
| 10,376,791 | B1 | 8/2019 | Thomas et al. |

(Continued)

*Primary Examiner* — SM A Rahman
(74) *Attorney, Agent, or Firm* — Neo IP

(57) ABSTRACT

The present invention provides an improved method for synchronizing a mobile application to a video broadcast. A server platform is in communication with a plurality of user devices. The server platform retrieves and transmits data regarding a live broadcast event to the plurality of user devices and provides an interactive activity related to the live broadcast event. In one embodiment, in order to account for delays between the broadcasts of different players, the server platform utilizes at least one graphical element and/or at least one audiovisual element of the live broadcast event to generate separate delay pools for each of the plurality of user devices. The plurality of user devices include a mobile application showing sprites representing a plurality of players or objects in the live broadcast event, which are synchronized to a display device based on the delay pools for each of the plurality of user devices.

20 Claims, 8 Drawing Sheets

(56) References Cited

U.S. PATENT DOCUMENTS

| | | | |
|---|---|---|---|
| 10,467,327 | B1 | 11/2019 | Arazi |
| 10,821,367 | B2 | 11/2020 | Stafford et al. |
| 11,082,746 | B2 | 8/2021 | Lockton |
| 11,083,965 | B2 | 8/2021 | Lockton et al. |
| 11,334,883 | B1 * | 5/2022 | Auerbach ............ G06Q 20/223 |
| 11,568,446 | B1 | 1/2023 | Cansizoglu et al. |
| 2012/0162435 | A1 | 6/2012 | Elangovan et al. |
| 2014/0368601 | A1 * | 12/2014 | deCharms .............. H04N 7/148 348/14.02 |
| 2016/0104347 | A1 | 4/2016 | Yang |
| 2020/0084360 | A1 * | 3/2020 | Song ................. H04M 1/72409 |
| 2020/0111325 | A1 | 4/2020 | Lockton et al. |
| 2021/0016168 | A1 | 1/2021 | Soon-Shiong et al. |
| 2021/0056750 | A1 | 2/2021 | Rowley |
| 2021/0174091 | A1 | 6/2021 | Doucette |
| 2021/0382587 | A1 | 12/2021 | Heikkinen et al. |
| 2021/0390576 | A1 | 12/2021 | Wargo et al. |
| 2022/0179665 | A1 | 6/2022 | Rathod |
| 2022/0328063 | A1 | 10/2022 | Mariotti et al. |

* cited by examiner 1,000 total participants

| 180 users | 180 users | 180 users | 180 users | 180 users | 100 users |
|---|---|---|---|---|---|

Live pool

FIG. 5

BROADCAST SYNCHRONIZATION WITH FAN ENGAGEMENT PLATFORM

CROSS-REFERENCES TO RELATED APPLICATIONS

The application is related to and claims priority from the following U.S. patent documents: this application is a continuation of U.S. patent application Ser. No. 18/978,826, filed Dec. 12, 2024, which is a continuation of U.S. patent application Ser. No. 18/086,168, filed Dec. 21, 2022 and issued as U.S. Pat. No. 12,192,539, which is a continuation-in-part of U.S. patent application Ser. No. 17/978,598, filed Nov. 1, 2022 and issued as U.S. Pat. No. 12,010,357, which claims priority from U.S. Provisional Patent Application No. 63/274,301, filed Nov. 1, 2021, each of which is incorporated herein by reference in its entirety.

BACKGROUND OF THE INVENTION

1. Field of the Invention

The present invention relates to synchronizing electronic devices, and more specifically to synchronization through recognition of visual image data and/or audio data for the facilitation of interactive content based on live-streaming events.

2. Description of the Prior Art

It is generally known in the prior art to provide methods of synchronizing multiple electronic devices.

Prior art patent documents include the following:

U.S. Pat. No. 11,083,965 for Methodology for equalizing systemic latencies in television reception in connection with games of skill played in connection with live television programming by inventors Lockton et al., filed Feb. 7, 2020 and issued Aug. 10, 2021, discloses a method of and system for handling latency issues encountered in producing real-time entertainment such as games of skill synchronized with live or taped televised events. There are multiple situations that are dealt with regarding latencies in receiving a television signal with respect to real-time entertainment based on the unfolding games played along with the telecasts. Systemic delays, arbitrarily imposed delays of a broadcast signal and variances in the precise broadcast times of taped television programs have to be equalized so as to provide fair entertainment.

US Patent Publication No. 2020/0111325 for Method and systems for reducing risk in setting odds for single fixed in-play propositions utilizing real time input by inventors Lockton et al., filed Feb. 14, 2019 and published Apr. 9, 2020, discloses a skill game operator provides real time propositions to a viewing audience, and based on the input received from those propositions, comparable In-Play wagering propositions are able to be generated, and the odds of the In-Play propositions are able to be accurately adjusted based on the actual input received from the same participating audience the skill game operator's responses to the same propositions.

U.S. Pat. No. 11,082,746 for Synchronized gaming and programming by inventor Lockton, filed May 30, 2017 and issued Aug. 3, 2021, discloses that, to encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, played in connection with a football telecast.

US Patent Publication No. 2021/0056750 for Creating and distributing interactive addressable virtual content by inventor Rowley, filed Nov. 5, 2020 and published Feb. 25, 2021, discloses systems and methods to create and distribute addressable virtual content with interactivity. The virtual content may depict a live event and may be customized for each individual user based on dynamic characteristics (e.g., habits, preferences, etc.) of the user that are captured during user interaction with the virtual content. The virtual content is generated with low latency between the actual event and the live content that allows the user to interactively participate in actions related to the live event. The virtual content may represent a studio with multiple display screens that each show different live content (of the same or different live events), and may also include graphic displays that include related data such as statistics corresponding to the live event, athletes at the event, and so on. The content of the display screens and graphics may be automatically selected based on the dynamic characteristics of the user.

U.S. Pat. No. 10,821,367 for Interactive gaming via mobile playmaker by inventors Stafford et al., filed Jun. 4, 2016 and issued Nov. 3, 2020, discloses systems and techniques relating to interactive gaining. A system includes one or more site servers providing game instances to one or more devices in communication with the one or more site servers via a wired network, a wireless network, or both. The system includes a server system in communication with the one or more site servers, and one or more wireless mobile devices in communication with the server system. The server system can be configured to provide information about one or more of the gaming instances at one or more sites to the one or more mobile devices; receive, from the one or more mobile devices, an indication of a selected gaming instance of the gaming instances; relay gaming information between the one or more site servers and the one or more mobile devices; and provide gaming content and one or more gaming functions to the site servers.

US Patent Publication No. 2021/0016168 for Latency management in an event driven gaming network by inventors Soon-Shiong et al., filed Jul. 17, 2020 and published Jan. 21, 2021, discloses one exemplary aspect relating to normalizing latency in a networking environment to reduce the chances of creating an unfair advantage. While an exemplary aspect will be discussed in relation to a gaming environment, it is to be appreciated that the techniques can be applied to other environments where latency normalization or the ability to maintain latency between various endpoints is desired. For example, other environments include eSporting, on-line betting, fantasy esports, streaming services, etc. Some more specific examples include World of Warcraft®, Overwatch®, H1Z1®, PUBG®, Fortnite®, Realm Royale®, Planet Side 2®, real-time strategy games, slot machines, electronic poker tournaments, etc.

U.S. Pat. No. 10,376,791 for Time lag synchronized, simultaneous gameplay of trivia contests by inventors Thomas et al., filed Oct. 24, 2017 and issued Aug. 13, 2019, discloses a system and methodology for executing a trivia contest/tournament simultaneously to a plurality of electronic devices, while eliminating fraud associated with trivia contests by ensuring that every gameplay experience across multiple devices, regardless of location, is consistent. This is accomplished by onboarding an electronic device, receiving a current date and time of the underlying user in a predetermined set of parameters, generating a payload (start time of contest, questions, order of questions, duration of each question, termination time of contest, etc.) and transmitting it to the electronic device at a time before the start of the contest. The lag time between all electronic devices is calculated and accounted for, so that each device starts the contest at the same time. The trivia contest takes place and terminates, so that each player has the same experience. Their answers are encrypted and transmitted back to the system for recording and assessment.

U.S. Pat. No. 8,858,313 for Methods, systems, and devices for synchronized parallel gameplay by inventor Selfors, filed Jul. 9, 2012 and issued Oct. 14, 2014, discloses an invention relating to a network-based quiz game and related methods that is playable in parallel relative to and synchronized with an event of interest such as a sports event. This embodiment can be a massively multiplayer game in one embodiment. The players of the game include various participant using electronic devices. The game and relates methods can be implemented using a client server architecture and various hardware and software components.

U.S. Pat. No. 10,275,578 for Continuous content identification of broadcast content by inventors Bilobrov et al., filed Jul. 10, 2017 and issued Apr. 30, 2019, discloses providing identification and continuous monitoring of content, such as broadcast content, in real time, using a hierarchical, distributed approach to content identification. Identification, synchronization and verification are provided. Identification may be performed by an identification server using a reference database of fingerprints. The same or another computing device may be used perform synchronization, such that at least some portion of each fingerprint generated by client devices that form a verification group are synchronized for verification. Verification used to determine whether a client device continues to receive the same content identified during identification compares at least a portion of each fingerprint generated by each client device of a verification group. If a mismatch occurs, identification may be repeated to identify the new content being received by a client device.

U.S. Pat. No. 9,832,441 for Supplemental content on a mobile device by inventor Osman, filed Jul. 20, 2012 and issued Nov. 28, 2017, discloses methods, systems, devices, and software for providing supplemental content for presentation on a mobile device that identifies a video and a portion within the video. In one embodiment, a system includes a mobile device with an integrated video camera that tracks a display playing a movie. The mobile device automatically identifies the current scene in the movie and then accesses supplemental non-video content related to the identified scene. The accessed supplemental non-video content (e.g., audio, tactile, olfactory data) is then presented to the user at the same time the movie is played.

U.S. Pat. No. 10,205,776 for Method and device for wireless connection by inventors Liang et al., filed Aug. 18, 2015 and issued Feb. 12, 2019, discloses a first terminal device creating a peer-to-peer (P2P) group, and then determining a Service Set Identifier (SSID) and a connection password of the P2P group, and then sending the SSID and the connection password to a second terminal device so that the second terminal device is able to connect to the first terminal device according to the SSID and the connection password. In this way, prior to establishment of the wireless connection, the second terminal device may acquire the SSID and the connection password of the P2P group created by the first terminal device, thus second terminal device may directly use the SSID and the connection password to connect to the first terminal device without cumbersome discovery and negotiation processes as used in establishment of a conventional P2P connection.

SUMMARY OF THE INVENTION

The present invention relates to synchronizing electronic devices, and more specifically to synchronization through recognition of visual image data and/or audio data for the facilitation of interactive content based on live-streaming events.

It is an objective of this invention to provide for increased fairness in games and other interactive activities related to live-streaming events, especially for users with different visual delays in viewing the live-streaming events.

In one embodiment, the present invention is directed to a system for live engagement with broadcast events, including at least one server, including a processor and a memory, configured to receive and transmit a live broadcast stream to a plurality of display devices, at least one user device in network communication with the at least one server, and a plurality of location trackers attached to a plurality of game participants, configured to transmit location and/or orientation data to the at least one server, wherein the at least one server is configured to automatically introduce at least one unique visual code into the broadcast stream, such that the at least one unique visual code is displayed on each of the plurality of display devices, wherein the at least one server receives a confirmation message, confirming the at least one user device scanning the at least one unique visual code, wherein, based on scan data for each of the at least one user device, each of the at least one user device is placed in one of a plurality of delay pools, wherein the plurality of delay pools indicate an approximate delay of the broadcast stream for a display device associated with each of the at least one user device, wherein the at least one user device displays locations of each of the plurality of game participants on a map interface based on the location and/or orientation data, and wherein display of the plurality of game participants on the map interface of a particular user device is automatically delayed based on the one of the plurality of delay pools in which the particular user device is placed.

In another embodiment, the present invention is directed to a system for live engagement with broadcast events, including at least one server, including a processor and a memory, configured to receive and transmit a live broadcast stream to a plurality of display devices, at least one user device in network communication with the at least one server, and a plurality of location trackers attached to a plurality of game participants, configured to transmit location and/or orientation data to the at least one server, wherein the at least one server is configured to automatically introduce at least one audio signal into the broadcast stream, such that the at least one audio signal is played by each of the plurality of display devices, wherein the at least one server receives a confirmation message, confirming the at least one user device detecting the at least one audio signal, wherein, based on audio signal detection data for each of the at least one user device, each of the at least one user device is placed in one of a plurality of delay pools, wherein the plurality of delay pools indicate an approximate delay of the broadcast stream for a display device associated with each of the at least one user device, wherein the at least one user device displays locations of each of the plurality of game participants on a map interface based on the location and/or orientation data, and wherein display of the plurality of game participants on the map interface of a particular user device is automatically delayed based on the one of the plurality of delay pools in which the particular user device is placed.

In yet another embodiment, the present invention is directed to a system for live engagement with broadcast events, including at least one server, including a processor and a memory, configured to receive and transmit a live broadcast stream to a plurality of display devices, at least one user device in network communication with the at least one server, and a plurality of location trackers attached to a plurality of game participants, configured to transmit location and/or orientation data to the at least one server, wherein the at least one server is configured to automatically introduce at least one unique signal into the broadcast stream, such that the at least one unique signal is played by each of the plurality of display devices, wherein the at least one server receives a confirmation message, confirming the at least one user device detecting the at least one unique signal, wherein, based on signal detection data for each of the at least one user device, each of the at least one user device is placed in one of a plurality of delay pools, wherein the plurality of delay pools indicate an approximate delay of the broadcast stream for a display device associated with each of the at least one user device, wherein the at least one user device displays locations of each of the plurality of game participants on a map interface based on the location and/or orientation data, wherein display of the plurality of game participants on the map interface of a particular user device is automatically delayed based on the one of the plurality of delay pools in which the particular user device is placed, and wherein the map interface generates a plurality of sprites representing each of the plurality of game participants.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 5 illustrates a system for dividing pools based on equal numbers of participants in each pool according to one embodiment of the present invention.

DETAILED DESCRIPTION

Figure 1:
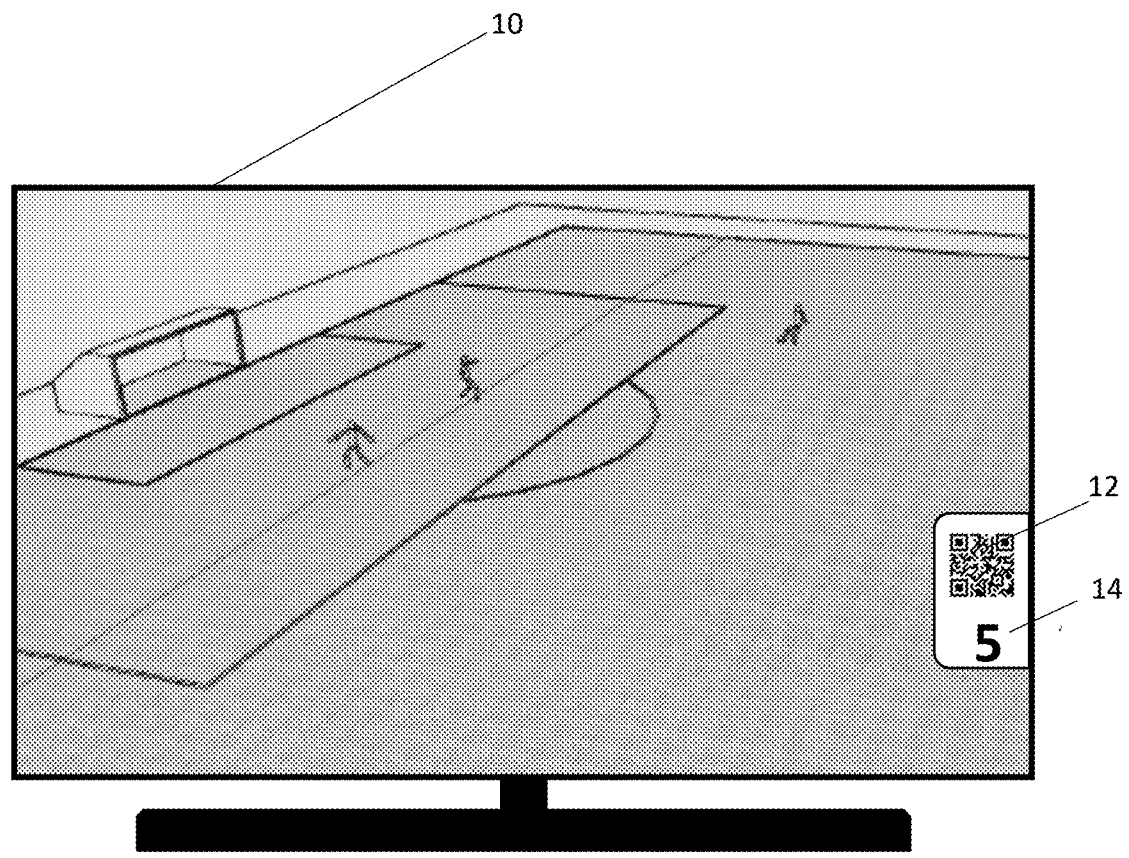
FIG. 1 illustrates a display with a time-stamped, changing unique code and a countdown timer according to one embodiment of the present invention.

The present invention is generally directed to synchronizing electronic devices, and more specifically to synchronization through recognition of visual image data and/or audio data for the facilitation of interactive content based on live-streaming events.

In one embodiment, the present invention is directed to a system for live engagement with broadcast events, including at least one server, including a processor and a memory, configured to receive and transmit a live broadcast stream to a plurality of display devices, at least one user device in network communication with the at least one server, and a plurality of location trackers attached to a plurality of game participants, configured to transmit location and/or orientation data to the at least one server, wherein the at least one server is configured to automatically introduce at least one unique visual code into the broadcast stream, such that the at least one unique visual code is displayed on each of the plurality of display devices, wherein the at least one server receives a confirmation message, confirming the at least one user device scanning the at least one unique visual code, wherein, based on scan data for each of the at least one user device, each of the at least one user device is placed in one of a plurality of delay pools, wherein the plurality of delay pools indicate an approximate delay of the broadcast stream for a display device associated with each of the at least one user device, wherein the at least one user device displays locations of each of the plurality of game participants on a map interface based on the location and/or orientation data, and wherein display of the plurality of game participants on the map interface of a particular user device is automatically delayed based on the one of the plurality of delay pools in which the particular user device is placed.

In another embodiment, the present invention is directed to a system for live engagement with broadcast events, including at least one server, including a processor and a memory, configured to receive and transmit a live broadcast stream to a plurality of display devices, at least one user device in network communication with the at least one server, and a plurality of location trackers attached to a plurality of game participants, configured to transmit location and/or orientation data to the at least one server, wherein the at least one server is configured to automatically introduce at least one audio signal into the broadcast stream, such that the at least one audio signal is played by each of the plurality of display devices, wherein the at least one server receives a confirmation message, confirming the at least one user device detecting the at least one audio signal, wherein, based on audio signal detection data for each of the at least one user device, each of the at least one user device is placed in one of a plurality of delay pools, wherein the plurality of delay pools indicate an approximate delay of the broadcast stream for a display device associated with each of the at least one user device, wherein the at least one user device displays locations of each of the plurality of game participants on a map interface based on the location and/or orientation data, and wherein display of the plurality of game participants on the map interface of a particular user device is automatically delayed based on the one of the plurality of delay pools in which the particular user device is placed.

In yet another embodiment, the present invention is directed to a system for live engagement with broadcast events, including at least one server, including a processor and a memory, configured to receive and transmit a live broadcast stream to a plurality of display devices, at least one user device in network communication with the at least one server, and a plurality of location trackers attached to a plurality of game participants, configured to transmit location and/or orientation data to the at least one server, wherein the at least one server is configured to automatically introduce at least one unique signal into the broadcast stream, such that the at least one unique signal is played by each of the plurality of display devices, wherein the at least one server receives a confirmation message, confirming the at least one user device detecting the at least one unique signal, wherein, based on signal detection data for each of the at least one user device, each of the at least one user device is placed in one of a plurality of delay pools, wherein the plurality of delay pools indicate an approximate delay of the broadcast stream for a display device associated with each of the at least one user device, wherein the at least one user device displays locations of each of the plurality of game participants on a map interface based on the location and/or orientation data, wherein display of the plurality of game participants on the map interface of a particular user device is automatically delayed based on the one of the plurality of delay pools in which the particular user device is placed, and wherein the map interface generates a plurality of sprites representing each of the plurality of game participants.

None of the prior art utilizes scanning of visual elements of a broadcast in order to determine delay times for facilitating interactive activities in relation to a live broadcast event.

Various game or mobile app applications, such as betting apps and other game-based entertainment apps, have been developed to engage viewers and fans in live sporting events. The viewers and fans are able to use these game applications while they are physically attending the sporting event or while watching a live broadcast on television offsite. Due to various reasons, including various broadcast latencies and imposed delays, supposedly live television broadcasts are not truly in real time, but experience delays relative to true live video data. When game applications are not in sync with a television broadcast in front of a user, it negatively impacts the utility of the game application and the overall user experience, as what the user will see and interact with on the game application will not closely correspond to what the user is currently watching. However, for users who are physically attending the live sporting event, there is no such delay for learning the progress of the live sporting event. It is therefore unfair for users in front of television broadcast to compete with those physically at the live sporting event. Thus, there is a need to synchronize game applications with live television broadcasts to make gaming fair and more enjoyable.

Referring now to the drawings in general, the illustrations are for the purpose of describing one or more preferred embodiments of the invention and are not intended to limit the invention thereto.

In one embodiment, the present invention includes a server platform, in communication with a processor and a database. The server platform is in network communication with a plurality of user devices (e.g., smartphones, computers, tablet, smart watches, etc.) and is able to transmit data to and/or receive data from the plurality of user devices through one or more game applications on the user devices. The server platform is configured to collect or receive live event data related to a live sporting event (or another type of live event, such as a live comedy performance) and transmit the live event data to the plurality of user devices through the one or more game applications. In one embodiment, an integrated automated sports data collection and analytics platform as described in U.S. Pat. Nos. 10,471,304 or 10,994,172 is utilized to obtain and synchronize live event data. The functionality of the platforms described in these documents includes creating a normalized time synchronized data set with timestamped data. Each of U.S. Pat. Nos. 10,471,304 and 10,994,172 is incorporated herein by reference in its entirety. In one embodiment, the server platform is also operable to generate and/or receive video streams for the live television broadcast of the sporting event (or other type of live event) and transmit the video stream to the plurality of user devices.

In one embodiment, the server platform is operable to construct and transmit at least one prompt to the plurality of user devices before, during, or after the live television broadcast (e.g., "Will Tampa Bay's quarterback throw for over 350 yards?"). The server platform is configured to receive a response selection to the at least one prompt (e.g., "yes or no"). In one embodiment, the selectable responses to the at least one prompt include "yes" and "no." In another embodiment, the selectable responses to the at least one prompt include options other than "yes" or "no."

In order to facilitate fair participation in an interactive activity or enjoyable viewing of an integrated mobile application, the server platform constructs a plurality of pools of participants. Each pool of participants is configured to have substantially the same broadcast delay for the live television broadcast of each participant in the pool, and therefore each participant in the pool is viewing substantially the same thing at the same time. In one embodiment, prompts are transmitted to each participant in a pool at approximately the same time, but prompts are able to be transmitted to different pools at different times. Additionally, in situations in which the interactive activity is competitive (e.g., a skill-based betting game), only participants in the same pool compete against each other, thereby largely eliminating potential gained advantages for those with less delayed broadcasts. In another embodiment, participants in different pools compete against each other, but the time at which each participant is prompted and the time in which each participant is able to respond varies depending on which pool each participant is in.

Pools of participants are created by calculating a delay time for each participant and then dividing the total population of participants into different pools, wherein participants in each pool have substantially the same delay time. In one embodiment, the server platform is operable to receive a selection from each of the plurality of user devices designating a broadcast provider (e.g., a cable provider, a satellite provider, a streaming service, etc.). In another embodiment, the server platform is operable to automatically detect a broadcast provider associated with each participant. In one embodiment, the server platform is operable to automatically collect geolocation data from each of the plurality of user devices, wherein the geolocation data is generated by a geolocation sensor (e.g., a global positioning system (GPS) chip in the user device). In one embodiment, the server platform restricts participants from engaging in an interactive activity if a designation of a broadcast provider is not received from a user device associated with the participant and/or if the server platform is unable to gather geolocation data for the user device associated with the participant.

In one embodiment, the server platform is configured to receive a selection of a type of television and/or a resolution of the television. In one embodiment, the server platform is configured to receive a selection of whether high-dynamic-range (HDR) features are enabled. In one embodiment, the server platform is configured to receive a selection of whether a digital video recorder (DVR) device is being used for the broadcast. Beyond factors relating to the broadcaster and location of the viewer, broadcast delays also occur due to processing delays incurred for formatting images for higher resolution televisions. As such, in order to provide a more accurate delay time for each individual, information regarding the resolution of the television is useful to obtain. For example, broadcasts received in 4K resolution with HDR enabled will generally suffer more latency than lower resolution broadcasts, all else equal. Similarly, systems with DVR enabled are likely to suffer more latency than those without DVR, as DVR requires additionally processing that causes further delays.

In one embodiment, at least one pool of the participants constructed by the server platform is always constructed to be a live pool. The live pool includes all participants determined to be physically at the live broadcast event, meaning that the participants suffer no broadcast delay. In one embodiment, the server platform stores geolocation data for each live broadcast event. If a user device connected to the server platform is determined to be within a predetermined distance of the live broadcast event (e.g., 0.5 miles, 1 mile, 5 miles, 10 miles, etc.), then the user device is automatically placed in the live pool. In one embodiment, the server platform is configured to receive a selection from a user device designating that the participant associated with the user device is physically attending the live broadcast event.

Prior art systems, such as that described in U.S. Pat. No. 11,083,965, have only utilized baseline information regarding the type of broadcaster, geolocation, and potential additional sources of broadcasting delays (such as a DVR) to determine delay times. However, additional causes of delay exist and the risk of dishonesty regarding one's providers and/or location exist in these prior systems, allowing some participants to potentially gain advantage over other participants in competitive activities. Therefore, it is needed to provide an additional form of confirmation of the delay of each participant and a method for obtaining a more accurate delay timing for each participant.

In one embodiment, a user device is used to scan at least one region of the screen on which the live broadcast is being displayed. The server platform then receives a scanned image of the screen in addition to timestamped metadata providing the time at which the scanned image was taken. In one embodiment, the server platform stores actual live data, including the actual time at which various events in a live broadcast event occur. By way of example and not of limitation, in one embodiment, the database records that a first event occurs at 3:04:56 PM EST when a game clock reads 2:30. If the server platform receives an image captured (according to metadata) at 3:05:12 PM EST showing the game clock as reading 2:30, then the server platform is operable to verify that a delay of 16 seconds exists for the participant.

In one embodiment, the live broadcast event is a competitive game and the user device scans a graphical scorebug on the display, including the current score and/or the current time left in the game. In some situations, the current time left in the game is particularly useful, as it allows for a more precise calculation of delay timing based on the timer reading. This is most useful in a competitive game such as soccer, where the timer continues to run without many causes of timer stoppage. Because the timer almost never stops (with the exception of half-time), participants are less able to exploit the ability to take images of the graphical scorebug during different points in a timeout to gain slight advantages over other players. By way of example and not of limitation, in an American football game, only using the graphical scorebug at the beginning of a timeout to capture a time of 10:50 remaining does not provide sufficient specificity to determine the delay of the broadcast, if the timer still reads 10:50 after minutes of advertisements. On the other hand, in one embodiment, the system is configured to determine and record "non-unique times" and exclude those times from being used for verification. By way of example and not of limitation, in one embodiment, the system rejects images reading 10:50, but accepts images with a time reading 10:49 or 10:51 because those values only are presented on a broadcast for approximately one second.

FIG. 1 illustrates a display with a time-stamped, changing unique code and a countdown timer according to one embodiment of the present invention. In another embodiment, the live broadcast includes at least one associated time-stamped, changing unique code 12 (e.g., a changing Quick Response (QR)-code, a changing barcode, a unique image, etc.) appearing on the display 10. By way of example and not of limitation, in one embodiment, the live broadcast is transmitted with a corresponding set of QR-codes. The QR-codes for the broadcast change at preset time intervals (e.g., every 1 second, every 3 seconds, every 5 seconds, every 10 seconds, every 30 seconds, every minute, etc.). In addition, in one embodiment, a countdown timer 14 is displayed under the QR-code, providing the amount of time (e.g., number of seconds) until a new QR-code is sent. In one embodiment, the server platform receives an image taken by a user device of the QR-code and/or the associated countdown timer associated with metadata providing the time at which the image was taken. The QR-codes are the same for each participant at the same point in each broadcast. The use of a time-stamped, changing unique code 12 is particularly advantageous, as it is able to persist even through commercial breaks and does risk stopping, unlike a game timer. Furthermore, QR-codes are more difficult to forge than simple timer icons. Furthermore, providing a countdown timer 14 is advantageous, as it allows the QR-code to not need to change every second, while still providing high specificity regarding the delay time of the broadcast. In one embodiment, the QR-code is able to be displayed upon selection on the display device, similar to closed-captioning systems. This allows the QR-code to be consistently usable by those participants who need it, while also not constantly taking up space on the screen. In another embodiment, the time-stamped, changing unique code is an audio code (e.g., an embedded audio signal in the broadcast). In one embodiment, the frequency, relative volume, cadence, tone, and/or other qualities of the audio code change over time to ensure that the audio encodes a unique timestamp in the broadcast. The audio code is recorded by a microphone on the user device and transmitted to the server platform together with associated time-stamped metadata.

In another embodiment, the server platform is operable to recognize at least one action event in an image or video sent by a user device with time-stamped metadata. By way of example and not of limitation, in one embodiment, the server platform is configured to recognize a football formation before a particular play and recognize when the snap occurs. In one embodiment, the server platform includes at least one artificial intelligence module operable to detect unique events in a live broadcast that are useful in synchronization of the plurality of user devices. Unique events include visual events (e.g., a particular football formation) or audio events (e.g., a particular whistle frequency on the broadcast).

Figure 2:
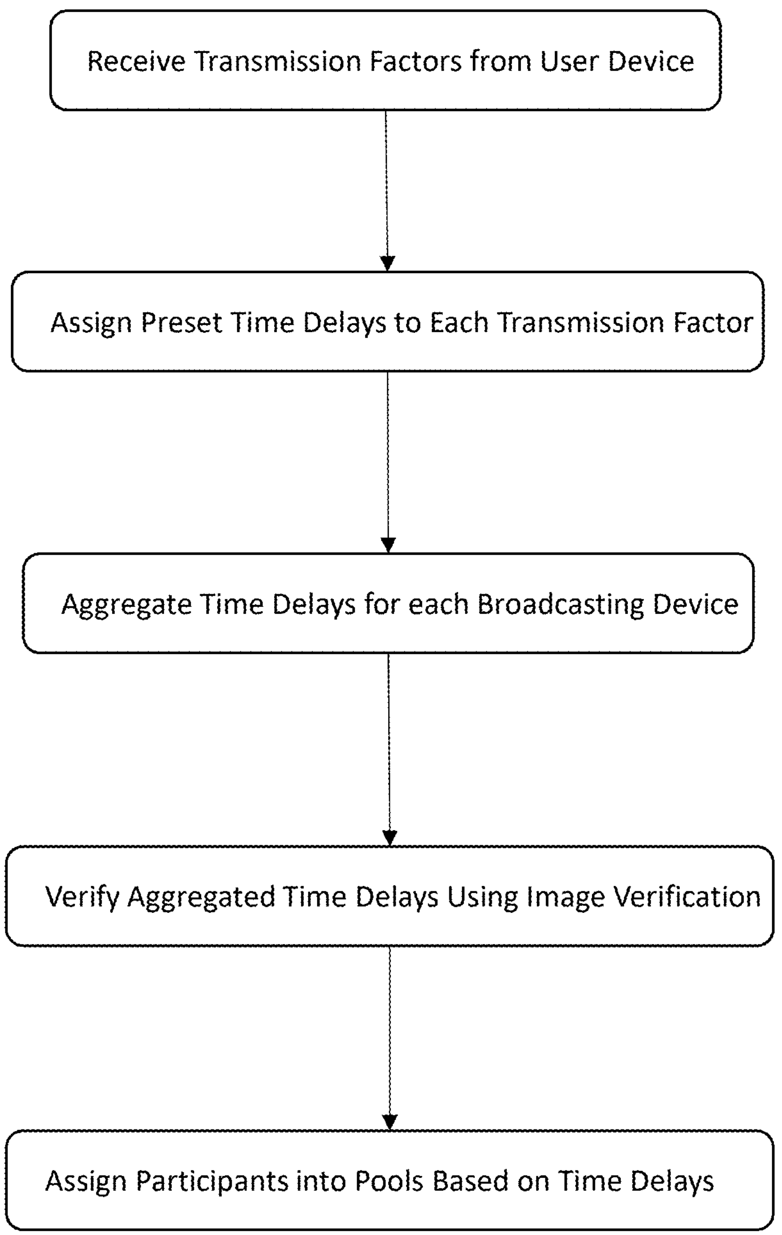
FIG. 2 is a flow diagram of a process of generating pools based on preset delay timings for each of a plurality of transmission factors according to one embodiment of the present invention.

FIG. 2 is a flow diagram of a process of generating pools based on preset delay timings for each of a plurality of transmission factors according to one embodiment of the present invention. In one embodiment, the server platform stores preset delay contributors for each factor impacting transmission. By way of example and not of limitation, a particular broadcast provider has a preset delay contributor of +5 seconds, a particular geographical region has a preset delay contributor of +6.5 seconds, a particular resolution has a preset delay contributor of +1 second, HDR has a preset delay contributor of +1 second, and a particular type of DVR has a preset delay contributor +2 seconds. Overall, the estimated delay timing is calculated to be +15.5 seconds. In another embodiment, preset delay contributors are based on an association of more than one factors. In another embodiment, combination of preset delay contributors is not purely additive. By way of example and not of limitation, there is no preset delay contributor for a particular broadcast provider without geographical information, but the preset delay contributor for a particular broadcast provider in a particular region is +12 seconds. In one embodiment, preset delay contributors change depending on the time period and/or weather data.

In one embodiment, based on the transmission factors provided by the user, the at least one transmitted image is used to confirm the delay timing for an individual. By way of example and not of limitation, in one embodiment, if a delay timing for an individual is estimated to be approximately +16 seconds, then the transmitted image is used to confirm the delay timing is within a predetermined interval of the estimated delay timing (e.g., within 10%, within 20%, or within 1 second, within 2 seconds, etc.). In one embodiment, if the delay timing is not confirmed to match the image, then the server platform disallows the participant from participating in the interactive activity. In another embodiment, if the delay timing is not confirmed to match the image, then the server platform places the participant in the pool matching the shorter of the delay timings between the estimated delay timing and the image-confirmed delay timing. In another embodiment, an estimated delay timing is not constructed at all, and placement into pools is dependent on a calculated delay timing based on the image data.

Figure 3:
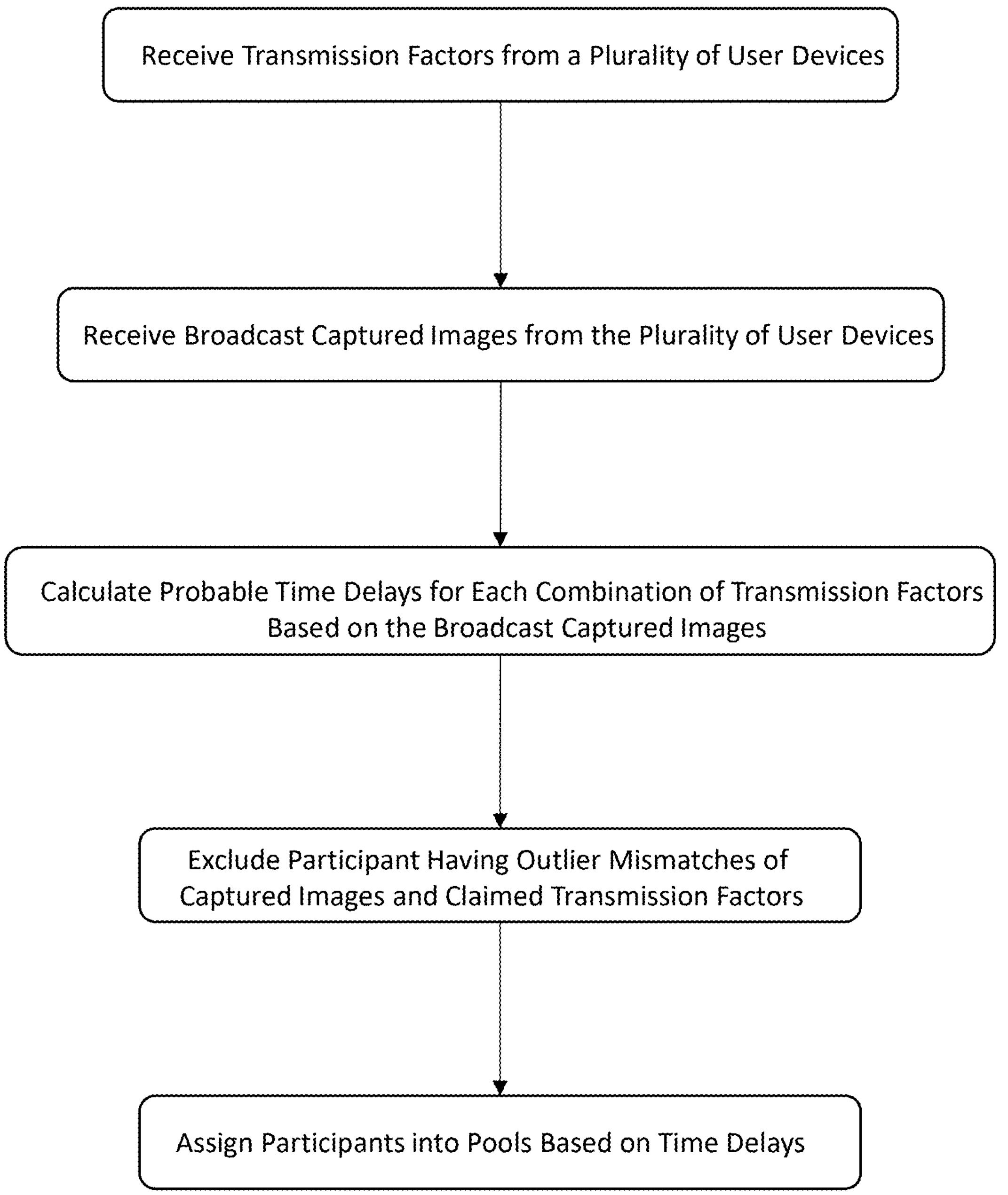
FIG. 3 is a flow diagram of a process of generating pools without preset delay timings for each of a plurality of transmission factors according to one embodiment of the present invention.

FIG. 3 is a flow diagram of a process of generating pools without preset delay timings for each of a plurality of transmission factors according to one embodiment of the present invention. In another embodiment, each transmission factor does not have a preset delay contributor. Instead, the server platform collects delay data regarding individuals having similar transmission factors and generates and estimated delay for the group having those transmission factors. By way of example and not of limitation, in one embodiment, a group exists of participants using a single broadcast provider in a single metropolitan area with no DVR, but using 4K resolution with HDR. Image data is used to confirm delay timings for each participant in the group. The server platform is then configured to generate a statistically likely delay timing for individuals with the same transmission factors and is able to identify those participants self-designating as having those transmission factors who lie outside a preset confidence interval (e.g., one standard deviation, two standard deviations, etc.) outside of the likely delay timing.

In one embodiment, if the user is detected as being physically present at the live broadcast event, or if the user self-designates as being located at the live broadcast event, then no image verification is necessary. Even if such a participant were to be dishonest regarding being in person, the participant would be unable to gain advantage from this, as those in the live pool are not suffering a delay and therefore the potentially dishonest participant would only potentially have less information than the participant's competitors.

In one embodiment, the server platform is operable to receive a selection to re-synchronize from one or more user devices. When the server platform receives a selection to re-synchronize, the server platform then prompts the user device to resubmit transmission factors relating to the broadcast and again perform image verification. This process allows users to easily move to another room or location and resync to a new screen such that they are able to more fairly participate, even if the display in the other room or location is using a different network, is in a different location, or has different processing factors.

Figure 4:
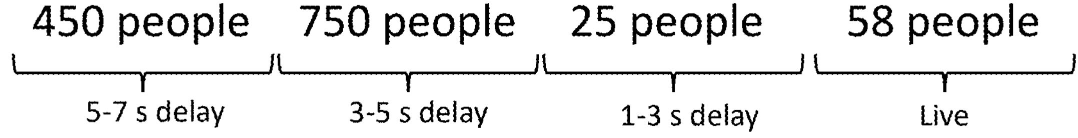
FIG. 4 illustrates a system for dividing pools based on fixed delay timing intervals according to one embodiment of the present invention.
Figure 5:
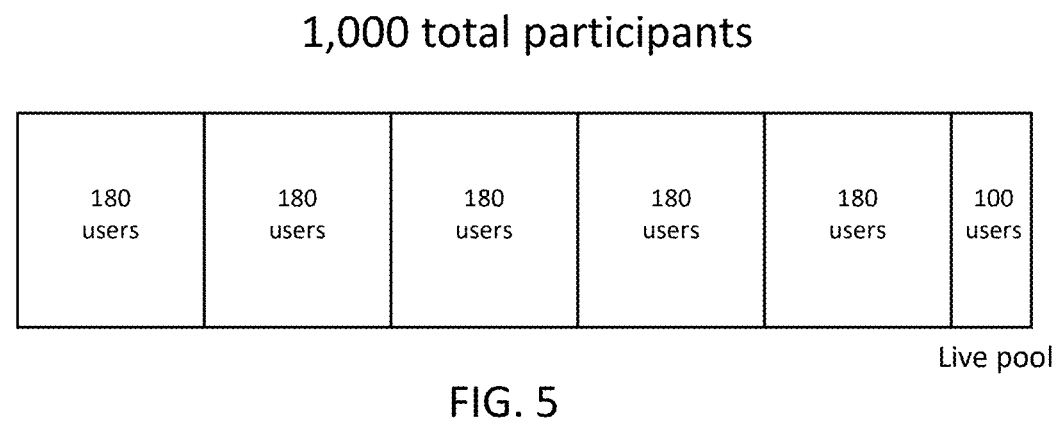

In one embodiment, the server platform generates pools of participants based on predetermined, fixed intervals of delay timing, as shown in FIG. 4. By way of example, and not of limitation, in one embodiment, the server platform divides users into pools including a live pool, a pool with 1-3 seconds of delay, a pool with 3-5 seconds of delay, a pool of 5-7 seconds of delay, etc. In another embodiment, the server platform is operable to divide all participants into approximately equally sized pools. In one embodiment, the number of pools is fixed. In another embodiment, the approximate number of participants in each pool is fixed. By way of example and not of limitation, in one embodiment, the server platform detects approximately 1000 people using a platform and having different delay timings. The server platform separates individuals attending an event live in a live pool, and then divides the remaining individuals into 5 pools, with the approximately 180 people having the shortest delay being in one pool and the approximately 180 people having the longest delay being in another pool, with 3 pools in between divided by magnitude of delay, as shown in FIG. 5. In yet another embodiment, the server platform includes an artificial intelligence engine, which automatically divides participants into pools based on a preferred pool size, a preferred number of pools, a preferred range of delays for each pool, geographical location of each participant, and/or a total number of participants.

In one embodiment, the server platform is operable to facilitate the exchange of at least one fiat currency and/or at least one cryptocurrency. In one embodiment, the server platform receives a designation of an amount of funds to be dedicated to a particular game application that facilitates interactive activities, including, but not limited to, skill-based wagers. The designated amount of funds is available to be used to bet on particular events during the live television broadcast event. Having participants input a designated amount of funds into the application before wagering is useful for better helping users to not lose more money than they intended to or are able to lose. In one embodiment, the designated amount of funds is automatically transferred to the server platform at the time of designation and converted into a native currency. Lost bets cause a deduction in the quantity of native currency for a participant, while won bots cause an increase in the quantity of native currency for the participant. In one embodiment, the server platform is operable to receive a selection to "cash out" from participants, causing at least a portion of the native currency held by the participant to be converted into a fiat currency and/or cryptocurrency selected by the participant.

In another embodiment, the server platform is operable to directly connect to at least one digital wallet, wherein lost bets are directly deducted from the at least one digital wallet in the form of a fiat currency or a cryptocurrency. Additionally, won bets are directly added to the at least one digital wallet in the form of a fiat currency or a cryptocurrency. In yet another embodiment, wagers are made using a native currency that does not directly corresponding to existing fiat currencies or cryptocurrencies.

In one embodiment, the server platform includes a betting module. In one embodiment, the betting module utilizes artificial intelligence (e.g., machine learning, neural networks, etc.) to generate prompts during the live broadcast event. In one embodiment, the prompts are questions regarding a potential future event in the live broadcast event (e.g., “Will the Patriots score a touchdown?”). In one embodiment, the betting module generates prompts that are most likely to generate an approximately 50/50 betting ratio, in order to ensure maximum interest in a wager. In one embodiment, the server platform includes at least one web crawler, operable to collect data from one or more social media websites and/or streaming websites (e.g., FACEBOOK, TWITTER, LINKEDIN, TUMBLR, REDDIT, INSTAGRAM, TWITCH, YOUTUBE, TIKTOK, etc.). Based on the data collected by the at least one web crawler, the betting module performs sentiment analysis in order to determine what prompts are most likely to yield an approximately 50/50 betting ratio. Prior art sentiment analysis methods able to be used by the betting module include, but are not limited to, those described in U.S. Pat. No. 11,086,885 and US Patent Publication No. 2015/0193482, each of which is herein incorporated by reference in its entirety. In another embodiment, the betting module does not attempt to approximate a 50/50 betting ratio.

In one embodiment, the server platform is operable to receive suggested prompts from one or more user devices. The betting module is operable to choose which prompts are transmitted to the plurality of user devices of the suggested prompts, based on which prompts are most likely to yield an approximately 50/50 betting ratio. In one embodiment, prompts send to each pool are the same prompts, albeit sent with different delays. In another embodiment, one or more pools receive different prompts. In one embodiment, the live pool receives one or more prompts regarding events occurring in the stadium that are not broadcast on television (e.g., a game of cornhole wherein a member of the crowd is chosen to play on the field).

In one embodiment, prompts are only able to be answered for a limited amount of time. By way of example and not of limitation, in one embodiment, the server platform is only able to receive a response to the prompt for 5 seconds, 10 seconds, 20 seconds, 30 seconds, 60 seconds, 5 minutes, 10 minutes, 30 minutes, an hour, or any other preselected time period after the prompt is sent. This limitation duration forces participants to bet before the event occurs such that the game is fair. In another embodiment, each prompt is not associated with a fixed amount of time to answer, and instead, responses to one or more prompts cannot be received after a particular event in the live broadcast occurs. By way of example and not of limitation, in one embodiment, when the live broadcast event is an American football game, prompts are set to be restricted when the next snap occurs.

The present invention solves a problem unique to computer technology, and specifically to Internet technology, as the issue of latency only arises when players have multiple disparate devices connected to a common network, such that latency occurs. Before the Internet, there was no way for players to participate in common interactive activities based on live broadcast events. This is especially true for live broadcast events wherein prompts are generated during the live broadcast event and are time sensitive such that they are only able to be completed during the live broadcast event.

Figure 6:
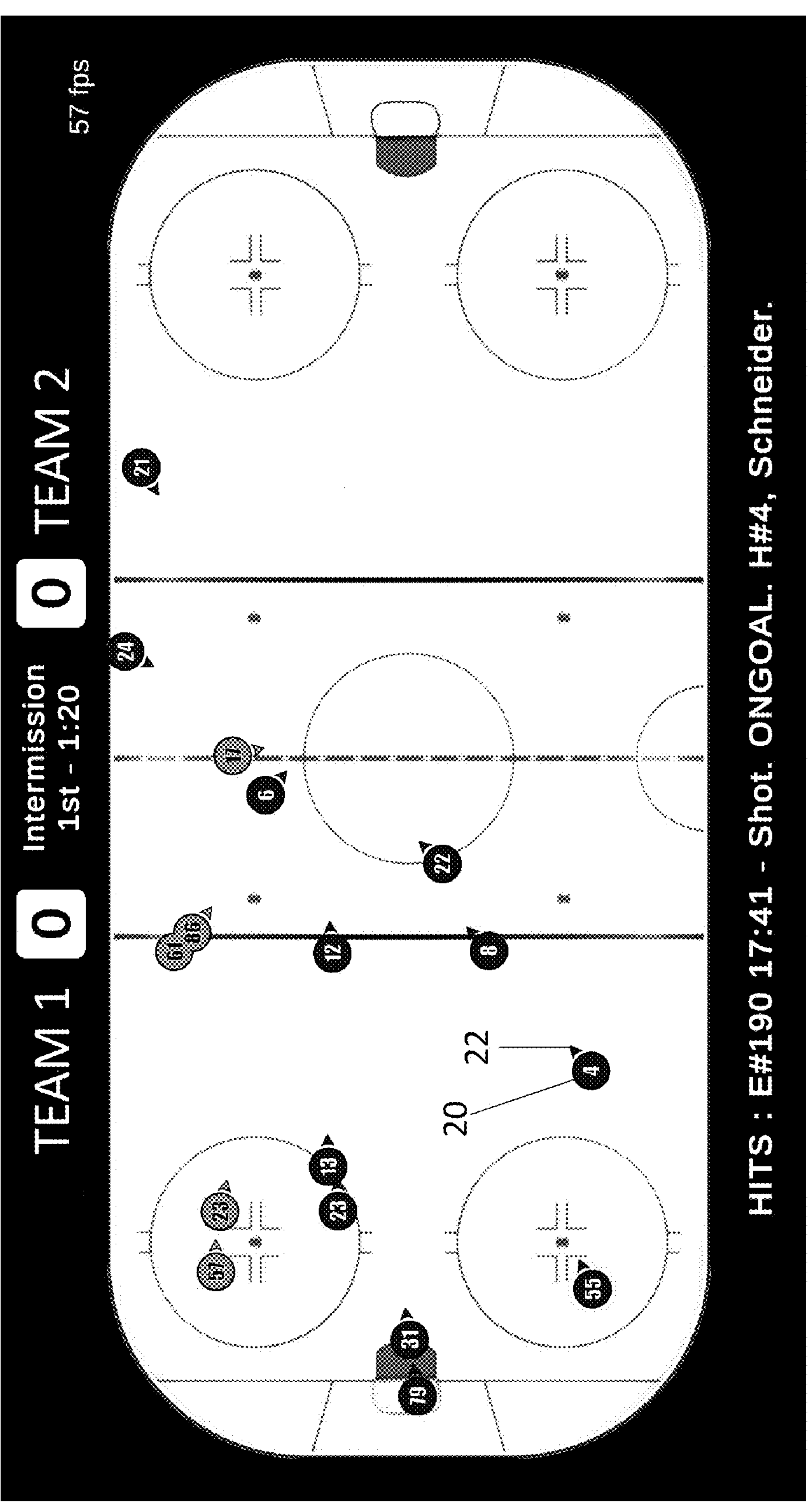
FIG. 6 illustrates a mobile user interface, showing the movement of players in a hockey game according to one embodiment of the present invention.

FIG. 6 illustrates a mobile user interface, showing the movement of players in a hockey game according to one embodiment of the present invention. In one embodiment, the synchronization system used by the present application is not only used to allow participation by viewers in activities such as betting, but also allows for an enhanced user experience through visualizations on a mobile application. In one embodiment, players in a game (e.g., a hockey game, a football game, a baseball game, etc.) have at least one location tracker attached to each of them. The at least one location tracker is able to include any device for determining location used in the prior art, including Global Positioning System (GPS) devices and/or other forms of location trackers. The at least one location tracker transmits location data for each player to the server platform, which then transmits the location data to be shown on a map interface of a mobile application on user devices used by viewers. In one embodiment, each of the at least one location trackers also transmits information regarding the orientation of each player (i.e., which direction each player is facing). This information is especially useful in a quick-paced game with high substitutions such as hockey, as players often have difficulty keeping track of relative player locations and the camera even occasionally tracks away from some players entirely in order to follow the game object (e.g., the puck, the ball, etc.).

In one embodiment, each player is shown on the map interface of the user device as a sprite 20 (e.g., a circle or other geometric shape, a small person shaped icon, etc.). In one embodiment, a number is displayed on the sprite 20, indicating the player number of each player. In one embodiment, an arrow 22 is positioned proximate to each sprite 20, showing an orientation of each player (i.e., what direction each player is facing). In one embodiment, the puck also includes at least one location tracker, configured to transmit puck location data to the server platform, such that the puck's location is shown by a sprite on the map interface. In one embodiment, the map interface includes identifying features of the field, court, rink, or other game location, such as boundary lines, penalty boxes, half-court lines, and other features. These features help to visualize the relative location of the players in the game location.

Without synchronization, the mobile application often encounters a significant usability problem. Sensor data, including location data, is able to be received and displayed much quicker than video data, especially high definition video data, as is commonly expected for sports broadcasts. Therefore, the movement of the players on the mobile application will often not correspond to what is on the screen, limiting usefulness and enjoyment of the app or actively causing frustration. Introducing a preset delay in the display of information on the app does not, by itself, solve the issue, as different video streams have different delays and therefore the mobile application must be synching to match the video stream.

Any of the aforementioned methods of synching are able to be used to sync the video stream with the mobile application, including, but not limited to, scanning a visual element on the screen (e.g., a unique code, a timer, etc.), detecting an audio signal embedded in the stream, and/or receiving information about the broadcast source (e.g., location, provider, resolution, video settings, etc.) regarding the broadcast from the user. In another embodiment, the video stream is synched to the mobile application through manual input of a time remaining in a game (or in a part of a game) through the user application. After the application is synched to the video stream, the sprites are able to directly correspond to the positions of the players shown on the actual video stream viewed by the user.

In one embodiment, the mobile application displays additional information regarding the game, including but not limited to the score, the amount of time remaining, the last player to touch the game object (e.g., the ball, the puck, etc.), the last player to attempt to score, and/or other information or player statistics. In one embodiment, sprites representing each player are labeled with a jersey number and/or another unique identifying number or string such that users are able to track which sprite represents which player.

Figure 7:
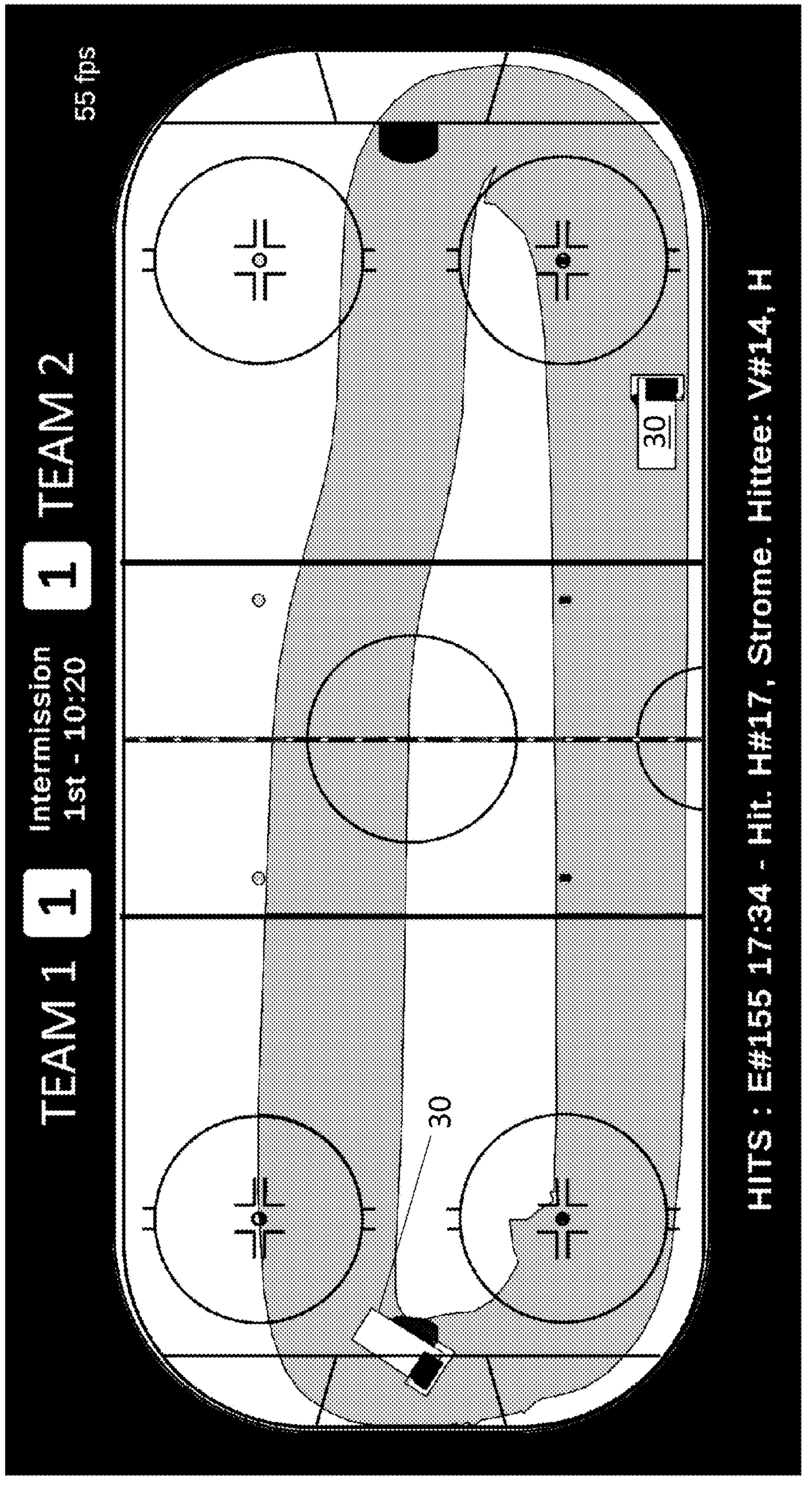
FIG. 7 illustrates a mobile user interface, showing the movement of an ice resurfacer on a hockey rink according to one embodiment of the present invention.

FIG. 7 illustrates a mobile user interface, showing the movement of an ice resurfacer on a hockey rink according to one embodiment of the present invention. As shown in FIG. 7, tracking of elements in a sports arena is not limited to players. In one embodiment, at least one location tracker is attached to at least one vehicle (e.g., an ice resurfacer, a lawn mower, a court buffer, a golf cart, etc.) on a field, rink, or court. In one embodiment, the at least one location tracker transmits location and/or orientation data for each of the at least one vehicle, or other relevant objects or elements. In one embodiment, the map interface displays the location of each vehicle. In one embodiment, the map interface shows the path that the vehicle previously traveled within a preset time period. This provides utility not only to a viewer, but to a manager or owner of the sports arena, who is able to check, for example, that all of the ice on a rink is resurfaced, or that all of the grass in a field is cut.

Figure 8:
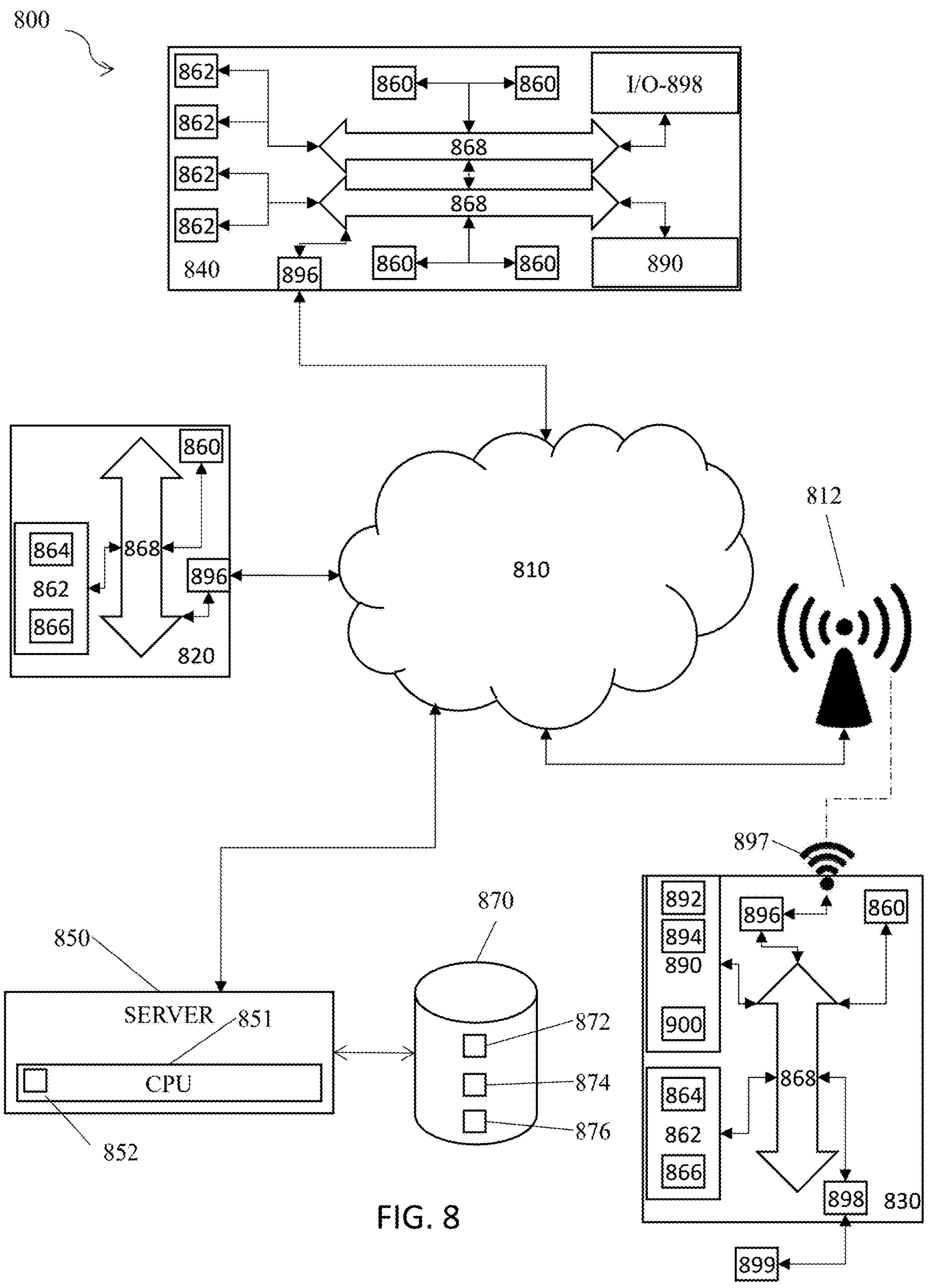
FIG. 8 is a schematic diagram of a system of the present invention.

FIG. 8 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 8, is operable to include other components that are not explicitly shown in FIG. 8, or is operable to utilize an architecture completely different than that shown in FIG. 8. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for live engagement with broadcast events, comprising:

at least one server, including a processor and a memory, configured to receive and transmit a live broadcast stream to a plurality of display devices;

at least one user device in network communication with the at least one server; and a plurality of location trackers associated with a plurality of game participants, configured to transmit location and/or orientation data to the at least one server;

wherein the at least one server is configured to automatically introduce at least one unique visual code into the broadcast stream, such that the at least one unique visual code is displayed on each of the plurality of display devices;

wherein, based on scan data for each of the at least one user device, each of the at least one user device is placed in one of a plurality of delay pools, wherein the plurality of delay pools indicate an approximate delay of the broadcast stream for a display device associated with each of the at least one user device; and wherein the at least one user device displays locations of each of the plurality of game participants on a map interface based on the location and/or orientation data.

2. The system of claim 1, wherein the at least one server automatically changes the at least one unique visual code in the broadcast stream at predetermined time intervals.

3. The system of claim 1, wherein the at least one unique visual code includes a QR code and/or a barcode.

4. The system of claim 1, wherein the map interface generates a plurality of sprites representing each of the plurality of game participants.

5. The system of claim 4, wherein each of the plurality of sprites is labeled with a jersey number and/or another unique identifier corresponding to a player represented by each of the plurality of sprites.

6. The system of claim 4, wherein each of the plurality of sprites includes an arrow indicating the direction in which a player represented by each of the plurality of sprites is facing, and wherein the directionality of the arrow is generated based on the orientation data produced by each of the plurality of location trackers.

7. The system of claim 1, further comprising at least one object tracker attached to at least one game object, wherein the at least one object tracker is configured to generate position and/or acceleration data for the at least one game object, and wherein the map interface displays a location of the at least one game object.

8. The system of claim 1, wherein the map interface further displays a score of a game, an amount of time remaining in the game, and/or player statistics.

9. A system for live engagement with broadcast events, comprising:

at least one server, including a processor and a memory, configured to receive and transmit a live broadcast stream to a plurality of display devices;

at least one user device in network communication with the at least one server; and a plurality of location trackers associated with a plurality of game participants, configured to transmit location and/or orientation data to the at least one server;

wherein the at least one server is configured to automatically introduce at least one audio signal into the broadcast stream, such that the at least one audio signal is played by each of the plurality of display devices;

wherein, based on audio signal detection data for each of the at least one user device, each of the at least one user device is placed in one of a plurality of delay pools, wherein the plurality of delay pools indicate an approximate delay of the broadcast stream for a display device associated with each of the at least one user device; and wherein the at least one user device displays locations of each of the plurality of game participants on a map interface based on the location and/or orientation data.

10. The system of claim 9, wherein the at least one server automatically changes the at least one audio signal in the broadcast stream at predetermined time intervals.

11. The system of claim 9, wherein the map interface generates a plurality of sprites representing each of the plurality of game participants.

12. The system of claim 11, wherein each of the plurality of sprites is labeled with a jersey number and/or another unique identifier corresponding to a player represented by each of the plurality of sprites.

13. The system of claim 11, wherein each of the plurality of sprites includes an arrow indicating the direction in which a player represented by each of the plurality of sprites is facing, and wherein the directionality of the arrow is generated based on the orientation data produced by each of the plurality of location trackers.

14. The system of claim 9, further comprising at least one object tracker attached to at least one game object, wherein the at least one object tracker is configured to generate position and/or acceleration data for the at least one game object, and wherein the map interface displays a location of the at least one game object.

15. The system of claim 9, wherein the map interface further displays a score of a game, an amount of time remaining in the game, and/or player statistics.

16. A system for live engagement with broadcast events, comprising:

at least one server, including a processor and a memory, configured to receive and transmit a live broadcast stream to a plurality of display devices;

at least one user device in network communication with the at least one server; and a plurality of location trackers associated with a plurality of game participants, configured to transmit location and/or orientation data to the at least one server;

wherein the at least one server is configured to automatically introduce at least one unique signal into the broadcast stream, such that the at least one unique signal is played by each of the plurality of display devices;

wherein, based on signal detection data for each of the at least one user device, each of the at least one user device is placed in one of a plurality of delay pools, wherein the plurality of delay pools indicate an approximate delay of the broadcast stream for a display device associated with each of the at least one user device;

wherein the at least one user device displays locations of each of the plurality of game participants on a map interface based on the location and/or orientation data; and wherein the map interface generates a plurality of sprites representing each of the plurality of game participants.

17. The system of claim 16, wherein the at least one server automatically changes the at least one unique signal in the broadcast stream at predetermined time intervals.

18. The system of claim 16, wherein each of the plurality of sprites is labeled with a jersey number and/or another unique identifier corresponding to a player represented by each of the plurality of sprites.

19. The system of claim 16, wherein each of the plurality of sprites includes an arrow indicating the direction in which a player represented by each of the plurality of sprites is facing, and wherein the directionality of the arrow is generated based on the orientation data produced by each of the plurality of location trackers.

20. The system of claim 16, further comprising at least one object tracker attached to at least one game object, wherein the at least one object tracker is configured to generate position and/or acceleration data for the at least one game object, and wherein the map interface displays a location of the at least one game object.

* * * * *